United States Patent
Syed et al.

(10) Patent No.: US 12,420,947 B2
(45) Date of Patent: Sep. 23, 2025

(54) INDICATOR FOR HYBRID AIRCRAFT POWER PLANT

(71) Applicant: PRATT & WHITNEY CANADA CORP., Longueuil (CA)

(72) Inventors: Yusuf Syed, Oakville (CA); Raphael Gariepy, Montreal (CA); Thomas Trevor Ricci, Pointe-Claire (CA); Todd Young, Orillia (CA); Piotr Twarecki, Palgrave (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 82 days.

(21) Appl. No.: 18/389,885

(22) Filed: Dec. 20, 2023

(65) Prior Publication Data

US 2025/0206459 A1    Jun. 26, 2025

(51) Int. Cl.
*B64D 45/00* (2006.01)
*B64D 27/33* (2024.01)

(52) U.S. Cl.
CPC ............. *B64D 45/00* (2013.01); *B64D 27/33* (2024.01)

(58) Field of Classification Search
CPC . B60L 2250/16; B60L 2260/54; B64D 45/00; B64D 27/33
See application file for complete search history.

(56) References Cited

U.S. PATENT DOCUMENTS

| | | | |
|---|---|---|---|
| 7,023,216 B2 | 4/2006 | Prema et al. | |
| 10,173,787 B1 * | 1/2019 | Oltheten | B64D 45/00 |
| 11,340,308 B1 | 5/2022 | Schreiber | |
| 11,742,679 B2 | 8/2023 | Ferrier | |
| 11,794,916 B2 | 10/2023 | Mark et al. | |
| 12,240,346 B2 * | 3/2025 | Mazzei | B60L 58/14 |
| 2003/0146027 A1 | 8/2003 | Yu | |
| 2012/0001883 A1 | 1/2012 | Tarkoma | |

(Continued)

FOREIGN PATENT DOCUMENTS

| | | |
|---|---|---|
| EP | 3910752 A1 | 11/2021 |
| EP | 3936376 A1 | 1/2022 |

(Continued)

OTHER PUBLICATIONS

European Patent Office, Communication re. extended European search report for European patent application No. 24222624.9, Apr. 14, 2023.

*Primary Examiner* — John A Tweel, Jr.
(74) *Attorney, Agent, or Firm* — Norton Rose Fulbright Canada LLP (57) ABSTRACT

An indication system for a hybrid aircraft power plant including an electric motor and a heat engine for driving an air mover configured to propel an aircraft is provided. The indication system includes a display providing a display area and a computer operatively connected to the display. The computer is configured to cause a first visual indication to be generated in the display area of the display. The first visual indication indicates a current amount of energy stored in a battery powering the electric motor of the hybrid aircraft power plant along a scale. The computer is configured to cause a second visual indication to be generated in the same display area of the display. The second visual indication indicates a remaining run time for the electric motor based on the current amount of energy stored in the battery.

20 Claims, 8 Drawing Sheets

(56) References Cited

U.S. PATENT DOCUMENTS

| | | |
|---|---|---|
| 2020/0277081 A1 | 9/2020 | Krenz |
| 2022/0063431 A1 | 3/2022 | Gurusamy et al. |
| 2022/0227229 A1 | 7/2022 | Nishida |
| 2023/0012962 A1 | 1/2023 | Potvin |
| 2023/0202321 A1 | 6/2023 | Mazzei |
| 2023/0348094 A1 | 11/2023 | List et al. |
| 2024/0367807 A1* | 11/2024 | Freer ................... B64D 27/02 |

FOREIGN PATENT DOCUMENTS

| | | |
|---|---|---|
| EP | 4082917 A1 | 11/2022 |
| WO | 2020180372 A2 | 9/2020 |

* cited by examiner

| SOC (%) | Available Energy Capacity (kWh) |
|---|---|
| SOC1 | E1 |
| SOC2 | E2 |
| SOC3 | E3 |

FIG-4

| Action | Energy Requirement (kWh) |
|---|---|
| A1 (e.g., Takeoff) | R1 |
| A2 (e.g., Go-Around) | R2 |
| A3 | R3 |

INDICATOR FOR HYBRID AIRCRAFT POWER PLANT

TECHNICAL FIELD

The disclosure relates generally to aircraft, and more particularly to hybrid aircraft power plants.

BACKGROUND

Hybrid aircraft power plants that include a heat engine and an electric motor for propelling aircraft can provide operational advantages. However, conveying useful information about the operational state of the hybrid aircraft power plant to the flight crew in an efficient manner during operation of the aircraft can be challenging. Improvement is desirable.

SUMMARY

In one aspect, the disclosure describes a hybrid aircraft power plant comprising:
  an electric motor for driving an air mover configured to propel an aircraft;
  a battery operatively connected to power the electric motor;
  a thermal engine for driving the air mover; and
  an indicator including:
   a first visual indication indicating a current amount of energy stored in the battery along a scale having a first region, a second region and a third region visually indicated along the scale, the first region representing a first amount of energy insufficient to execute a go-around with the aircraft, the second region representing a second amount of energy greater than the first amount of energy and sufficient to execute the go-around with the aircraft, the third region representing a third amount of energy greater than the second amount of energy and sufficient to execute a takeoff with the aircraft; and
   a second visual indication indicating a remaining run time for the electric motor based on the current amount of energy stored in the battery, the first visual indication and the second visual indication both being in a same display area of a display.

The first visual indication may be adjacent the second visual indication.

The first visual indication may include a textual field displaying a variable numerical value indicative of the current amount of energy stored in the battery.

The first visual indication may include a marker movable along the scale to graphically indicate the current amount of energy stored in the battery along the scale.

The first visual indication may include a tick mark in the third region. The tick mark may visually indicate a minimum amount of energy stored in the battery required at takeoff of the aircraft.

The marker may be a first marker. The first visual indication may include a second marker movable along the scale to graphically indicate a future amount of energy stored in the battery along the scale based on a current discharge rate of the battery.

The second visual indication may include a textual field displaying a numerical value indicative of the remaining run time for the electric motor.

The scale of the first visual indication may be a first scale. The second visual indication may include a second scale. The remaining run time for the electric motor may be indicated along the second scale.

The first scale and the second scale may be linear bars.

The first scale and the second scale may be parallel.

The second scale may include two or more visually distinct regions.

The second scale may be devoid of visually distinct regions.

The remaining run time for the electric motor may be for a current discharge rate of the battery.

The remaining run time for the electric motor may be for a discharge rate of the battery associated with a takeoff output power setting for the electric motor.

The remaining run time for the electric motor may be a first remaining run time for the electric motor for a current discharge rate of the battery. The second visual indication may include a second remaining run time for the electric motor for a discharge rate of the battery associated with a takeoff output power setting for the electric motor.

Embodiments may include combinations of the above features.

In another aspect, the disclosure describes an indication system for a hybrid aircraft power plant including an electric motor and a heat engine for driving an air mover configured to propel an aircraft. The indication system comprises:
  a display providing a display area; and
  a computer operatively connected to the display, the computer being configured to:
  cause a first visual indication to be generated in the display area of the display, the first visual indication indicating a current amount of energy stored in a battery powering the electric motor of the hybrid aircraft power plant along a scale, the scale having a first region, a second region and a third region visually indicated along the scale, the first region representing a first amount of energy insufficient to execute a go-around with the aircraft, the second region representing a second amount of energy greater than the first amount of energy and sufficient to execute the go-around with the aircraft, the third region representing a third amount of energy greater than the second amount of energy and sufficient to execute a takeoff with the aircraft; and
  cause a second visual indication to be generated in the same display area of the display, the second visual indication indicating a remaining run time for the electric motor based on the current amount of energy stored in the battery.

The first visual indication may include a first textual field displaying a numerical value indicative of the current amount of energy stored in the battery. The second visual indication may include a second textual field displaying a numerical value indicative of the remaining run time for the electric motor.

The scale of the first visual indication may be a first scale. The second visual indication may include a second scale. The remaining run time for the electric motor may be indicated along the second scale.

The remaining run time for the electric motor may be a first remaining run time for the electric motor for a current discharge rate of the battery. The second visual indication may include a second remaining run time for the electric motor for a discharge rate of the battery associated with a takeoff output power setting for the electric motor.

Embodiments may include combinations of the above features.

In a further aspect, the disclosure describes a method for indicating an operational state of a hybrid aircraft power plant driving an air mover configured to propel an aircraft. The method comprises:

when the air mover is driven by an electric motor of the hybrid aircraft power plant using energy stored in an electric energy source:
generating a first visual indication on a display area of a display, the first visual indication indicating a current amount of energy stored in the electric energy source along a scale having a first region, a second region and a third region visually indicated along the scale, the first region representing a first amount of energy insufficient to execute a go-around with the aircraft, the second region representing a second amount of energy greater than the first amount of energy and sufficient to execute the go-around with the aircraft, the third region representing a third amount of energy greater than the second amount of energy and sufficient to execute a takeoff with the aircraft; and
generating a second visual indication on the same display area of the display, the second visual indication indicating a remaining run time for the electric motor based on the current amount of energy stored in the electric energy source.

The first visual indication may include: a marker movable along the scale to graphically indicate the current amount of energy stored in the electric energy source along the scale; and a textual field displaying a variable numerical value indicative of the current amount of energy stored in the electric energy source.

Embodiments may include combinations of the above features.

Further details of these and other aspects of the subject matter of this application will be apparent from the detailed description included below and the drawings.

DESCRIPTION OF THE DRAWINGS

Reference is now made to the accompanying drawings, in which.

DETAILED DESCRIPTION

The present disclosure relates to indicators of hybrid aircraft power plants and methods of indicating an operational state of hybrid aircraft power plants. In some embodiments, the indicators and methods described herein may provide information about the state of a hybrid aircraft power plant in a relatively user-friendly and efficient manner that promotes enhanced operational awareness for the flight crew. For example, the indicators and methods described herein may display the operational state of and the assistance available from an electric motor of the hybrid power plant in an at-a-glance and intuitive manner. In various embodiments, the indicators and methods described herein may provide a first visual indication indicating a current amount of energy stored in a battery powering the electric motor, and a second visual indication indicating a remaining run time for the electric motor based on the current amount of energy stored in the battery. The first and second indications may be consolidated on a same display and presented in a unified format to the flight crew.

Aspects of various embodiments are described through reference to the drawings.

The term "connected" may include both direct connection (in which two elements that are coupled to each other contact each other) and indirect connection (in which at least one additional element is located between the two elements). The term "substantially" as used herein may be applied to modify any quantitative representation which could permissibly vary without resulting in a change in the basic function to which it is related. As used herein, the singular forms "a," "an," and "the" are intended to include the plural forms as well, unless the context clearly indicates otherwise.

Figure 1:
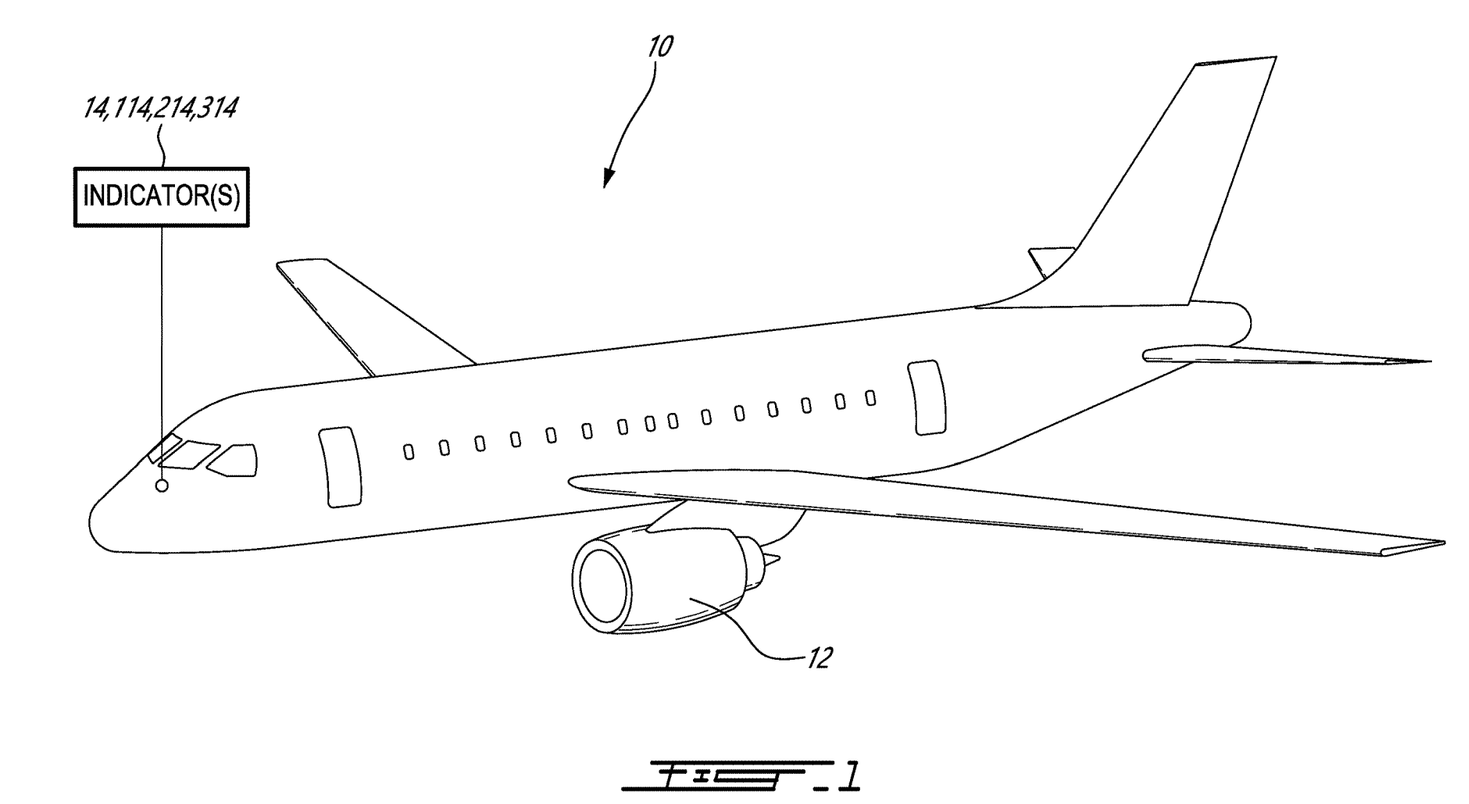
FIG. 1 is a perspective view of an exemplary aircraft including a hybrid power plant with an indicator as described herein.

FIG. 1 is a perspective view of an exemplary aircraft 10 including one or more hybrid power plants 12 (referred hereinafter in the singular as "power plant 12") as described herein. Aircraft 10 may include one or more indicator(s) 14, 114, 214, 314 (referred generally herein as "indicator 14") operatively connected to one or more other components of power plant 12 and providing operational awareness to the flight crew about the state of power plant 12. In various embodiments, indicator 14 may be operatively connected to one, two or more power plants 12 and provide operational awareness to the flight crew about the state of the one, two or more power plants 12. Indicator 14 may be located on a flight deck of aircraft 10 an be visible to the flight crew. In some embodiments, aircraft 10 may be a fixed wing aircraft. Power plant 12 may be operatively connected to one or more air movers (e.g., variable-pitch propellers, fans and/or other bladed rotors) configured to propel aircraft 10 by generating thrust for example. In some embodiments, aircraft 10 may be a rotary wing aircraft such as a helicopter and power plant 12 may be operatively connected to drive a main rotor and/or a tail rotor of the helicopter. Power plant 12 may be used to drive other types of air movers suitable for propelling aircraft. In various embodiments, aircraft 10 may be manned or may be unmanned (i.e., drone) and controlled by an operator located remotely of aircraft 10.

Figure 2:
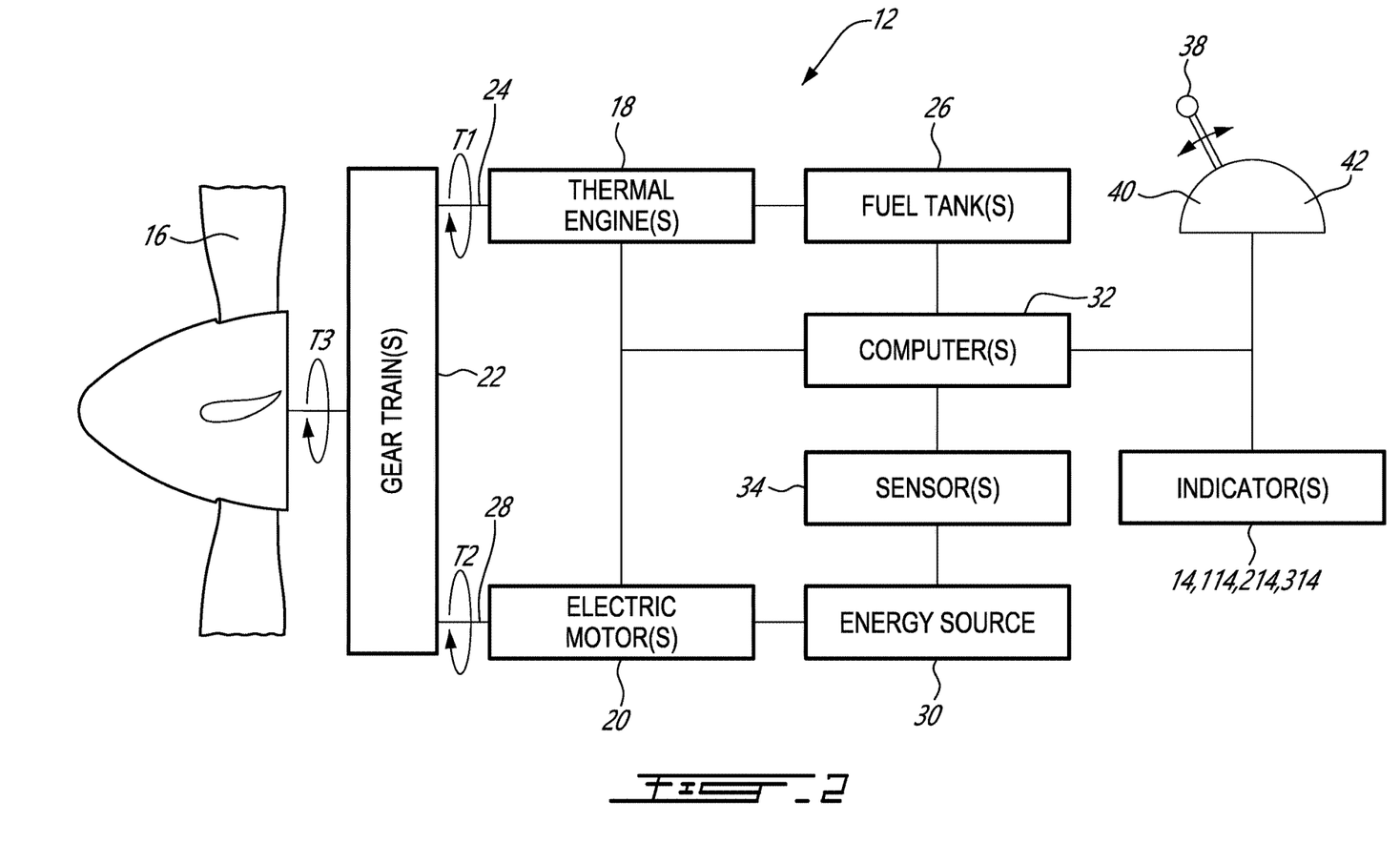
FIG. 2 is a schematic representation of an exemplary hybrid power plant of the aircraft of FIG. 1.

FIG. 2 is a schematic illustration of an exemplary configuration of power plant 12 being drivingly connected to propeller 16 as a non-limiting example of a suitable air mover. Power plant 12 may include one or more thermal engines 18 (referred hereinafter in the singular) and one or more electric motors 20 (referred hereinafter in the singular as "motor 20"). In various embodiments of power plant 12, thermal engine 18 and motor 20 may be arranged in parallel or in series. In some embodiments, one or both of thermal engine 18 and motor 20 may be drivingly connected to (i.e., in torque-transmitting engagement with) propeller 16 via one or more gear trains 22 (referred hereinafter in the singular). Propeller 16 may be a variable pitch propeller. In some embodiments, gear train 22 may include a combining gear train receiving respective input torques from thermal engine 18 and motor 20 and delivering a combined output torque to propeller 16. In some embodiments, gear train 22 may include a speed-reducing gear train, sometimes referred to as a reduction gearbox (RGB), so that the rotation speed of propeller 16 may be lower than an operating speed of thermal engine 18 and/or an operating speed of motor 20.

Thermal engine 18 may include a (e.g., continuous or intermittent) internal combustion engine. In various embodiments, thermal engine 18 may include a gas turbine engine, a rotary (e.g., Wankel) engine or a piston engine for example. Thermal engine 18 may generate first torque T1 at first shaft 24 from the combustion of a suitable fuel stored in fuel tank 26 and supplied to thermal engine 18.

In various embodiments, motor 20 may be a permanent magnet synchronous motor, a brushless direct-current (DC) electric motor, or an alternating-current (AC) motor for example. Motor 20 may generate second torque T2 at second shaft 28 via the conversion of electric energy received from energy source 30 (referred hereinafter as "energy source 30"). Energy source 30 may be a direct current (DC) electric source used to drive motor 20 via suitable power electronics (e.g., inverter) and motor controller. Energy source 30 may include one or more batteries (e.g., battery bank) or supercapacitors for example. Energy source 30 may include one or more lithium-ion batteries, one or more nickel-metal hydride batteries and/or one or more lead-acid batteries for example.

In some embodiments, energy source 30 may be rechargeable. For example, the operation of motor 20 as an electric generator may be used to recharge energy source 30 in some situations. In some embodiments, power plant 12 may be operated to manage the state-of-charge (SOC) of energy source 30 by the selective operation of motor 20 as a motor to draw energy from energy source 30 or as a generator to input energy into energy source 30. Alternatively or in addition, energy source 30 may be recharged using a ground-based source of electric power when aircraft 10 is on ground.

In various embodiments, thermal engine 18 and motor 20 may be controlled by one or more controllers implemented by one or more computer(s) 32 (referred hereinafter in the singular). In some embodiments, thermal engine 18 and motor 20 may be operated either together or separately to drive propeller 16. In some embodiments, the operation of thermal engine 18 and/or motor 20 may be selected based on a phase of flight of aircraft 10 and/or based on an action (e.g., maneuver) to be executed by aircraft 10. For example, during a takeoff phase, a climb phase and/or a go-around maneuver of aircraft 10, both thermal engine 18 and motor 20 may be used to cooperatively drive propeller 16. On the other hand, in a leveled cruise phase of flight, only thermal engine 18 may be used to drive propeller 16.

Computer 32 may be operatively connected to control the operation of thermal engine 18 and output power from thermal engine 18 in part by controlling a fuel flow from fuel tank 26 to thermal engine 18 via a suitable fuel metering unit for example. Computer 32 may be operatively connected to control the operation of motor 20 and output power from thermal engine 18 in part by controlling a delivery of electric current from energy source 30 to thermal engine 18 via suitable power electronics for example.

Power plant 12 may include one or more sensors 34 operatively connected to energy source 30 and/or to computer 32. In some embodiments, computer 32 may receive signals indicative of one or more parameters of energy source 30 via sensor(s) 34. The signals may be used by computer 32 to control the operation of motor 20 and/or assess a state of energy source 30. For example, sensor(s) 34 may include one or more voltage sensors, one or more current sensors and/or one or more temperature sensors. The signals received from sensor(s) 34 may be used by computer 32 to determine a SOC of energy source 30 and/or a (e.g., current, real-time) discharge rate or charge rate of energy source 30 for example. The SOC may be expressed as a percentage and may be the ratio of the available energy capacity and the maximum possible energy charge that can be stored in energy source 30. For example, a fully charged energy source 30 may have SOC of 100% while a fully discharged energy source 30 may have a SOC of 0%. The SOC may be a dynamic value derived from operating parameters, such as current, voltage, and temperature of energy source 30 and may change based on the operation of motor 20. The SOC decreases when energy source 30 is discharging and increases when energy source 30 is charging.

Indicator 14 may be provided on a flight deck of aircraft 10 or at another location visible by one or more operators of aircraft 10 such as a pilot and/or a first officer of aircraft 10 for example. Indicator 14 may be implemented via a suitable display 36 (shown in FIG. 3) located onboard aircraft 10 or located remotely of aircraft 10 in embodiments where aircraft 10 may be controlled and/or monitored remotely.

Computer 32 may also receive inputs from the flight crew commanding the operation of power plant 12. Such inputs may be received from input devices actuatable by the flight crew and may include one or more buttons, switches and/or levers for example. In some embodiments, such input devices may include a throttle input device such as throttle lever 38, which may also be referred to as a thrust lever or a power lever depending on the configuration of power plant 12.

Throttle lever 38 may be pivotable by the flight crew so that a throttle lever angle (TLA) may be indicative of a desired output power to be generated by power plant 12 and propeller 16. Computer 32 may control thermal engine 18 and/or motor 20 according to the TLA so that a desired amount of thrust may be produced via propeller 16. Throttle lever 38 may have predetermined angular settings suitable for different phases of flights or actions to be executed by aircraft 10. For example, throttle lever 38 may include takeoff or go-around (TO/GA) setting 40 indicative of a relatively high (e.g., maximum) amount of power being commanded, idle setting 42 indicative of a relatively low (e.g., minimum) amount of power being commanded, and a reverse thrust setting below idle setting 42. Other predetermined TLA settings may be provided between TO/GA setting 40 and idle setting 42.

A takeoff is a phase of flight in which an aircraft leaves the ground and becomes airborne. The takeoff may include a ground roll during which the airplane is accelerated from a standstill to an airspeed that provides sufficient lift for the aircraft to become airborne. The takeoff may require a full power setting to produce a maximum amount of thrust. A go-around is an aborted landing of an aircraft that is on final approach or has already touched down. The go-around can either be initiated by the pilot flying or requested by air traffic control for various reasons. A go-around may occur when the flight crew makes the decision not to continue an approach, or not to continue a landing, and follows procedures to conduct another approach or to divert to another airport for example. The go-around may require a full power setting to produce a maximum amount of thrust.

Figure 3:
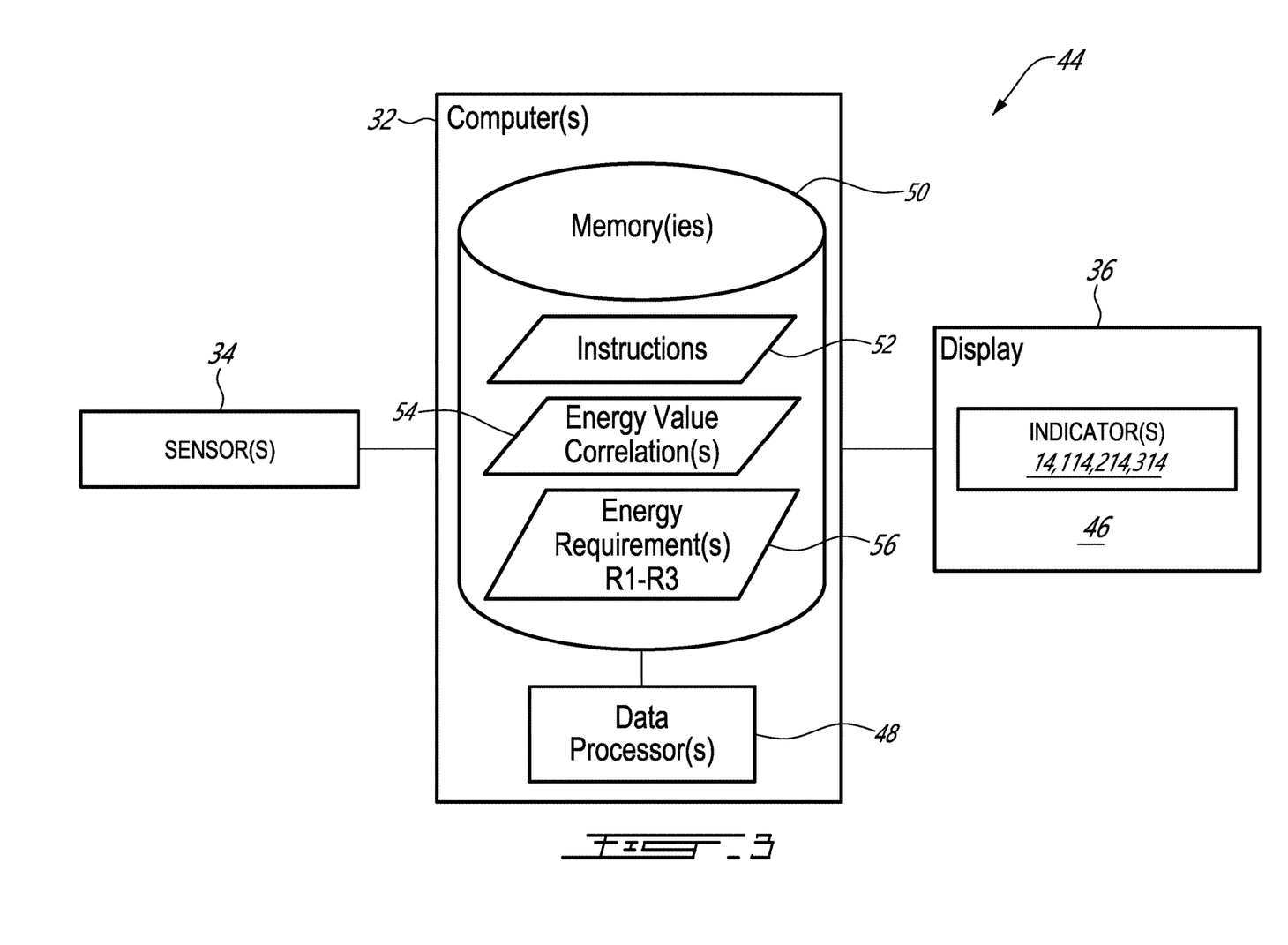
FIG. 3 is a schematic representation of an exemplary indication system of the hybrid power plant of the aircraft of FIG. 1.

FIG. 3 is schematic representation of an exemplary indication system 44 of power plant 12 of aircraft 10. Computer 32 may be operatively connected to sensor(s) 34 via wired and/or wireless connections so that computer 32 may receive signals indicative of one or more parameters of energy source 30 and/or of other components of power plant 12 via sensor(s) 34. The signals may be used by computer 32 to control the information presented by indicator 14. Display 36 may be operatively connected to computer 32 via wired or wireless connections to enable data communication between computer 32 and display 36. Computer 32 may cause display 36 to generate indicator 14 based on signals received via sensor(s) 34. In some embodiments, computer 32 may cause the information presented via indicator 14 to be variably (e.g., dynamically) displayed substantially in real-time based on signals received via sensor(s) 34. Accordingly, indicator 14 may present substantially up-to-date information to promote operational awareness of the flight crew. In various embodiments, display 36 may be a cathode ray tube (CRT) display device, a light-emitting diodes (LED) display device, or a liquid crystal display (LCD) device for example. Display 36 may provide display area 46 within which indicator 14 may be generated.

Computer 32 may include one or more data processors 48 (referred hereinafter in the singular) and non-transitory machine-readable memory(ies) 50 (referred hereinafter in the singular). Computer 32 may be configured to regulate the operation of display 36 and optionally also perform other tasks. Computer 32 may receive input(s) from sensor(s) 34 to perform one or more procedures or steps defined by instructions 52 stored in memory 50 and executable by processor(s) 48 to generate one or more outputs. The input(s) from sensor(s) 34 may be indicative of the SOC of energy source 30. Computer 32 may be configured to compute the SOC of energy source 30 using the input(s) from sensor(s) 34 using known or other methods. Computer 32 may make use of energy value correlation(s) 54 stored in memory 50 to determine the actual energy capacity available from energy source 30 based on the SOC. The SOC of energy source 30 or the actual energy capacity available from energy source 30 may be used to generate indicator 14. Computer 32 may also make use of energy requirements (e.g., table 56 shown in FIG. 4) stored in memory 50 for one or more actions to be executed by aircraft 10 to generate indicator 14.

Processor 48 may include any suitable device(s) configured to cause a series of steps to be performed by computer 32 so as to implement a computer-implemented process such that instructions, when executed by computer 32 or other programmable apparatus, may cause the functions/acts specified in the methods described herein to be executed. Processor 48 may include, for example, any type of general-purpose microprocessor or microcontroller, a digital signal processing (DSP) processor, an integrated circuit, a field programmable gate array (FPGA), a reconfigurable processor, other suitably programmed or programmable logic circuits, or any combination thereof.

Memory 50 may include any suitable machine-readable storage medium. Memory 50 may include non-transitory computer readable storage medium such as, for example, but not limited to, an electronic, magnetic, optical, electromagnetic, infrared, or semiconductor system, apparatus, or device, or any suitable combination of the foregoing. Memory 50 may include any storage means (e.g., devices) suitable for retrievably storing machine-readable instructions executable by processor 48.

Figure 4:
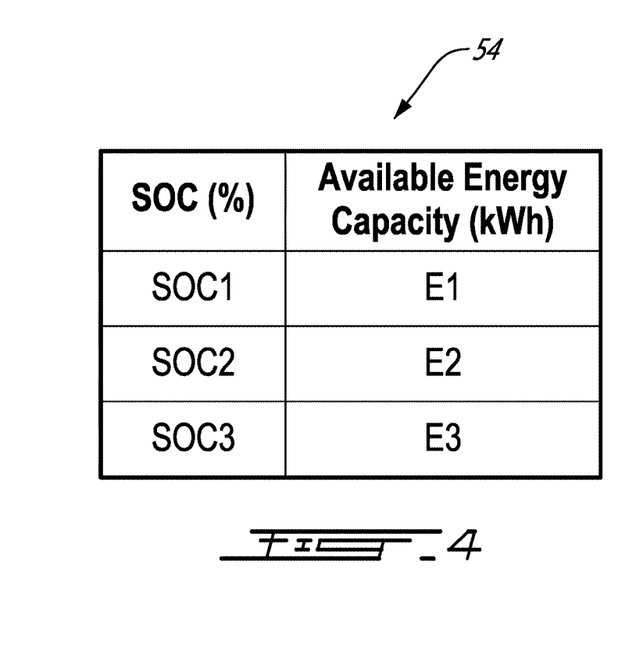
FIG. 4 is an exemplary table of state-of-charge values associated with a battery of the hybrid power plant and corresponding available energy capacity values for the respective state-of-charge values.

FIG. 4 is an exemplary energy value correlation 54 in the form of a look-up table that may be stored in memory 50 of computer 32. Energy value correlation 54 may include SOC values (e.g., SOC1-SOC3) associated with energy source 30 and corresponding available energy capacity values (e.g., E1-E3) for the respective SOC values SOC1-SOC3. After determining the SOC of energy source 30 based on one or more signals from sensor(s) 34, computer 32 may access energy value correlation 54 to determine a corresponding numerical energy capacity values E1-E3 currently available from energy source 30. Energy capacity values E1-E3 may be expressed in energy units such as kilowatt-hour (kWh), for example, to provide a concrete representation of the amount of energy available from energy source 30. The energy capacity value E1-E3 associated with the current (i.e., substantially real-time) SOC of energy source 30 may be used to generate indicator 14.

In various embodiments, energy value correlation 54 may be fixed (constant) or variable based on one or more factors. For example, energy value correlation 54 may be configured to depend on one or more operating conditions (e.g., temperature) of energy source 30. Alternatively or in addition, energy value correlation 54 may be configured to depend on a degradation of energy source 30 associated with aging of energy source 30 and/or on the number of discharge/charge cycles of energy source 30. In some embodiments, an indication of degradation of energy source 30 may be determined by or otherwise be available to computer 32. Energy value correlation 54 may be determined empirically and/or through simulation and modeling.

Figure 5:
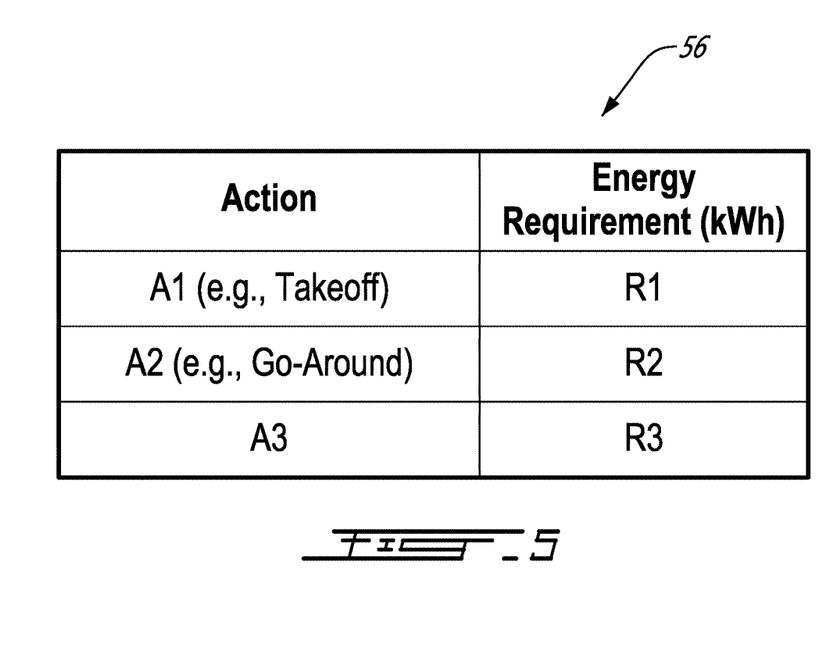
FIG. 5 is an exemplary table of actions that may be executed by the aircraft and corresponding energy requirements for the respective actions.

FIG. 5 is an exemplary table 56 of energy requirements R1-R3 by motor 20 respectively associated with actions A1-A3 that may be executed by aircraft 10. Table 56 may be stored in memory 50 in the form of a look-up table for example. Actions A1-A3 may include phases of operation/flight that may be executed by aircraft 10 such as takeoff and climb, and/or maneuvers such as a go-around that may be executed by aircraft 10. Energy requirements R1-R3 may be used by computer 32 to generate indicator 14 as explained further below. Energy requirements R1-R3 may be expressed in energy units such as kWh to facilitate the comparison with energy capacities E1-E3 for example. In some embodiments, energy requirements R1-R3 may each be numerical ranges determined empirically and/or through simulation and modeling. The numerical ranges for respective energy requirements R1-R3 may take into account possible variations in operating parameters (e.g., payload carried by aircraft 10, altitude and/or ambient temperature) of aircraft 10 for example. In some embodiments, energy requirements R1-R3 may be variable and based on one or more operating parameters of aircraft 10.

Figure 6:
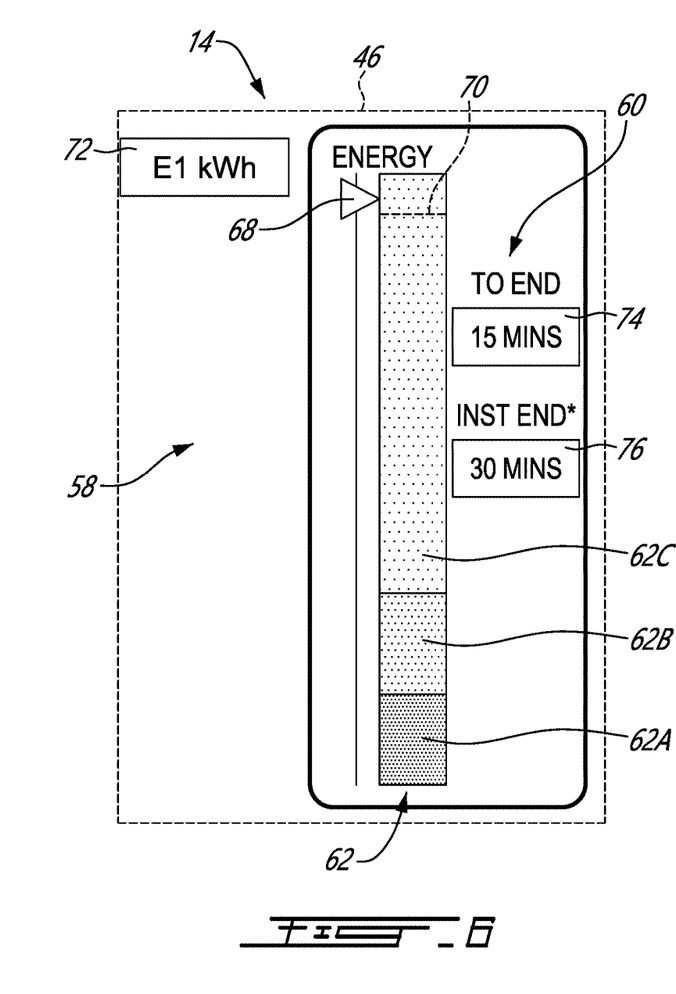
FIG. 6 shows an exemplary indicator of the hybrid power plant.

FIG. 6 shows an exemplary indicator 14 of power plant 12. Indicator 14 may be implemented by way of computer 32 causing display 36 to graphically output a visual representation of indicator 14. Indicator 14 may be generated in display area 46 of display 36 during operation of power plant 12 and elements of indicator 14 may be updated substantially in real-time by computer 32. In some embodiments, indicator 14 may provide operational awareness to the flight crew about the availability of motor 20. For example, indicator 14 may include first visual indication 58 indicating a current amount of energy stored in energy source 30 and available for driving motor 20, and second visual indication 60 indicating a remaining run time for motor 20 based on the current amount of energy stored in the energy source 30. First visual indication 58 and second visual indication 60 may be disposed in close proximity to each other. For example, both first visual indication 58 and second visual indication 60 may be located side by side within the same display area 46 of display 36. Second visual indication 60 may be adjacent first visual indication 58. First visual indication 58 and second visual indication 60 may be grouped together to display the assistance available from motor 20 of power plant 12 in an at-a-glance and intuitive manner.

In some embodiments, display 36 may be dedicated to only displaying indicator 14 as a dedicated gauge. Alternatively, display 36 may be a primary flight display or a multifunction display where only a portion (e.g., window) of display area 46 is used to generate indicator 14. First visual indication 58 and second visual indication 60 may be grouped together in a same window of display area 46.

First visual indication 58 may indicate a current amount of energy stored in energy source 30 along first scale 62 having two or more visually distinct regions. For example, first scale 62 may have first region 62A, second region 62B and third region 62C visually indicated along first scale 62. Regions 62A-62C may be disposed sequentially along first scale 62 and may be delimited based on the amount of energy that is required to execute certain actions A1-A3 with aircraft 10 to promote operational awareness in terms of actions that can be executed by aircraft 10 with the energy available in energy source 30. Second region 62B may be located between first region 62A and third region 62C along first scale 62.

In some embodiments, first scale 62 may be in the form of a linear bar (i.e., thick line) or a thinner straight line. First scale 62 may have a vertical or horizontal orientation in display area 46. Alternatively, first scale 62 may be arcuate and may be part of a rotary dial for example. The amount of energy stored in energy source 30 may be visually indicated along first scale 62 using first marker 68 movable along first scale 62 to graphically indicate the current amount of energy stored in energy source 30 along first scale 62. First marker 68 may be located next to (i.e., adjacent) first scale 62 and may be movable (e.g., vertically) along first scale 62. First marker 68 may be an arrow, dot, caret, needle or may have another suitable shape. Computer 32 may cause the position of first marker 68 to be dynamically adjusted substantially in real-time as energy source 30 is depleted or recharged. When first marker 68 is located at the top of first scale 62, this may indicate that energy source 30 is fully charged and may have a SOC of 100%. When first marker 68 is located at the bottom of first scale 62, this may indicate that energy source 30 is fully depleted and may have a SOC of 0%.

In various embodiments, regions 62A-62C of first scale 62 may be visually distinguished from each other using different colors, different fill patterns, different line types or different line weights. For example, first region 62A may be a red portion of first scale 62, second region 62B may be an amber portion of first scale 62, and third region 62C may be a green portion of first scale 62.

First region 62A may represent a relatively low amount of energy available in energy source 30. First region 62A may extend a first span (i.e., first energy range) along first scale 62 and may represent a first amount of energy that insufficient to execute a go-around and/or a takeoff with aircraft 10. For example, when first marker 68 is adjacent first region 62A, this may indicate that assistance from motor 20 would not be available to complete a go-around with aircraft 10. Accordingly, the flight crew may use the information from indicator 14 to manage the SOC of energy source 30 during flight to maintain an amount of energy in energy source 30 beyond first region 62A and hence sufficient to execute a go-around if needed.

Second region 62B may extend a second span (i.e., second energy range) along first scale 62 and may represent a second amount of energy greater than the first amount of energy. Second region 62B may represent an energy reserve sufficient to execute one or more actions with aircraft 10. For example, second region 62B may represent an energy reserve sufficient to execute at least one go-around with aircraft 10 with the assistance of motor 20 available throughout the go-around. Depending on the position of first marker 68 along second region 62B when the go-around is initiated (e.g., near the bottom of second region 68B), it is possible that executing the go-around would cause first marker 68 to drop into first region 62A at the completion of the go-around. For example, the intersection of second region 62B and first region 62A may represent a minimum amount of energy required to execute the go-around with (e.g., continuous) assistance from motor 20.

Third region 62C may extend a third span (i.e., third energy range) along first scale 62 and may represent a third amount of energy greater than the second amount of energy and sufficient to execute a takeoff with aircraft 10. When first marker 68 is adjacent third region 62C, this may indicate that energy source 30 holds sufficient energy so that assistance from motor 20 is available to execute and complete a takeoff, optionally a climb and optionally also a go-around with aircraft 10. In some situations, it may be desirable that the amount of energy available from energy source 30 be in third region 62C before initiating a flight with aircraft 10. For example, in some situations, a takeoff should not be commenced if the amount of energy available from energy source 30 is not in third region 62C.

Depending on the position of first marker 68 along third region 62C when a takeoff or go-around is initiated, it is possible that executing the takeoff or go-around would cause first marker 68 to drop into second region 62B or into first region 62A after the completion of the takeoff or the go-around.

In some embodiments, the entire third region 62C may represent an energy range that is sufficient to execute a takeoff with aircraft 10. For example, the intersection of second region 62B and third region 62C may represent a minimum amount of energy required to execute a takeoff with (e.g., continuous) assistance from motor 20. However, in some embodiments, it may be desirable to have enough energy available to complete the takeoff and also to complete one or more other maneuvers (e.g., climb and at least one go-around) before initiating flight with aircraft 10. For example, first visual indication 58 may include tick mark 70 located in third region 62C and visually indicating a minimum amount of energy within third region 62C required at takeoff. When first marker 68 is at or above tick mark 70, the amount of energy stored in energy source 30 may be sufficient to permit motor 20 to assist during the entire takeoff phase, optionally sufficient to assist in some or all of a climb phase of flight, and optionally also sufficient to assist for at least one go-around for example. In some embodiments, an amount of energy below tick mark 70 (e.g., when aircraft 10 is on ground) may trigger an alert on the flight deck to advise the flight crew that the amount of energy stored in energy source 30 is below the minimum required for a mission.

The spans of regions 62A-62C of first scale 62 may be determined based on the values of energy requirements R1-R3 provided in table 56 in proportion to the total available energy capacity (e.g., E1) of energy source 30 when energy source 30 is fully charged (i.e., SOC=100%). The spans of regions 62A-62C of first scale 62 may be determined by computer 32 using the values in table 56 and adjusted accordingly when generating indicator 14. Alternatively, the spans of regions 62A-62C of first scale 62 may be predetermined and static.

In some embodiments, first scale 62 and/or one or more regions 62A-62C of first scale 62 may optionally be adjusted to reflect a degradation of energy source 30 over time. For example, an overall length of first scale 62 may be shortened so that an upper portion of first scale 62 may no longer be available due to degradation. For example, the upper portion of third region 62C may become unavailable even for a fully charged energy source 30 due to the degradation of energy source 30 over time. This may reduce the margin between the top of third region 62C and tick mark 70 indicating a minimum amount of energy stored in energy source 30 required at takeoff. Alternatively, first scale 62 may remain the same overall length but the span(s) of one or more regions 62A-62C and/or the position of tick mark 70 may be adjusted along first scale 62 to reflect the degradation of energy source 30 over time.

In some embodiments, first visual indication 58 may optionally include first textual field 72 displaying a variable numerical value of the current amount of energy (e.g., available energy capacity E1) stored in energy source 30. In some embodiments, the current amount of energy may have suitable energy units (e.g., kWh) and may provide a concrete indication to the flight crew of the energy available in energy source 30. First textual field 72 may be located adjacent to first marker 68 and the numerical value displayed in first textual field 72 may be correlated to the position of first marker 68 along first scale 62. Computer 32 may cause the numerical value displayed in first textual field 72 to be dynamically adjusted substantially in real-time as energy source 30 is depleted or recharged. The numerical value displayed in first textual field 72 may be determined by computer 32 using energy value correlation 54 based on the SOC of energy source 30.

Second visual indication 60 may indicate a remaining run (operating) time of motor 20 based on the current amount of energy stored in energy source 30. First visual indication 58 may be adjacent second visual indication 60 to present different pieces of information in a unified format. In some embodiments, second visual indication 60 may include second textual field 74 displaying a numerical value of the remaining run time (e.g., minutes) of motor 20 based on the current amount of energy stored in energy source 30. For example, the remaining run time for motor 20 shown in second textual field 74 may be for a discharge rate of energy source 30 associated with a takeoff (e.g., maximum) output power setting for motor 20. The takeoff output power setting may correspond to a relatively high discharge rate of energy source 30 and may be associated with TO/GA setting 40 of throttle lever 38 shown in FIG. 2. Second textual field 74 may be indicative of an electrical endurance available from power plant 12 at the takeoff output power setting. Second textual field 74 may be shown when motor 20 is operating and also when motor 20 is not operating and may represent the run time left if throttle lever 38 were placed at TO/GA setting 40.

In some embodiments, second visual indication 60 may include third textual field 76 displaying a numerical value of the remaining run time (e.g., minutes) of motor 20 based on the current amount of energy stored in energy source 30. For example, the remaining run time for motor 20 shown in third textual field 76 may be for a current discharge rate of energy source 30 associated with a current output power setting for motor 20. The current output power setting may correspond to the current TLA of throttle lever 38 shown in FIG. 2. Third textual field 76 may be indicative of an instantaneous endurance available from motor 20 at the current output power setting. The numerical value of third textual field 76 may be displayed when motor 20 is operating and may be omitted from indicator 114 when motor 20 is not operating. For example, when no assistance is being requested from the motor 20, this numerical value may be removed from indicator 14 as the electrical endurance in this configuration may not be meaningful. In some embodiments, the calculation of this numerical value may use suitable filtering to smooth out jitters that may be associated with noisy or small movement(s) of throttle lever 38.

Figure 7:
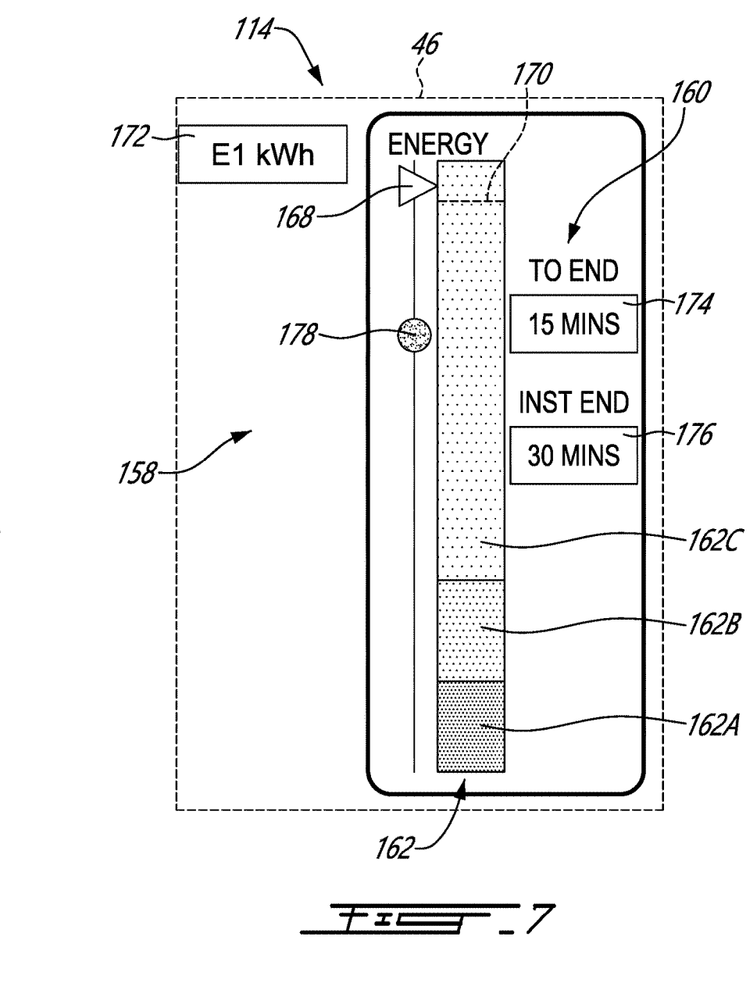
FIG. 7 shows another exemplary indicator of the hybrid power plant.

FIG. 7 shows another exemplary indicator 114 of power plant 12. Indicator 114 may include elements of indicator 14 previously described above. Like elements have been identified using like reference numerals incremented by 100. Indicator 114 may include first visual indication 158 and second visual indication 160. First visual indication 158 may include first scale 162 including first region 162A, second region 162B and third region 162C. First visual indication 158 may include first marker 168 movable along first scale 162 and tick mark 170 indicating a minimum amount of energy stored in energy source 30 required at takeoff. First visual indication 158 may include first textual field 172. Second visual indication 160 may include second textual field 174 and third textual field 176.

In contrast with indicator 14, indicator 114 may optionally include second marker 178 movable along first scale 162. Second marker 178 may be an arrow, dot, caret, needle or may have another suitable shape. Second marker 178 may have a different shape than first marker 168. Second marker 178 may have a different color than first marker 168. Second marker 178 may also be referred to as a battery energy vector indicating a future amount of energy stored in energy source 30 along first scale 162 based on a current discharge rate of energy source 30. The position of second marker 178 along first scale 162 may be indicative of a rate of depletion or energy source 30. In some embodiments, a current discharge rate of energy source 30 may be computed by determining a change of the SOC of energy source 30 over time. Alternatively, the position of second marker 178 may be estimated based on a current TLA. The future amount of energy may be estimated at a predetermined time duration in the future based on the current discharge rate of energy source 30. In some embodiments, the time duration may be one (1) minute in the future. Computer 32 may cause second marker 178 to move along first scale 62 substantially in real-time based on the current discharge rate of energy source 30. Second marker 178 may be displayed when motor 20 is operating and may be omitted from indicator 114 when motor 20 is not operating.

Figure 8A:
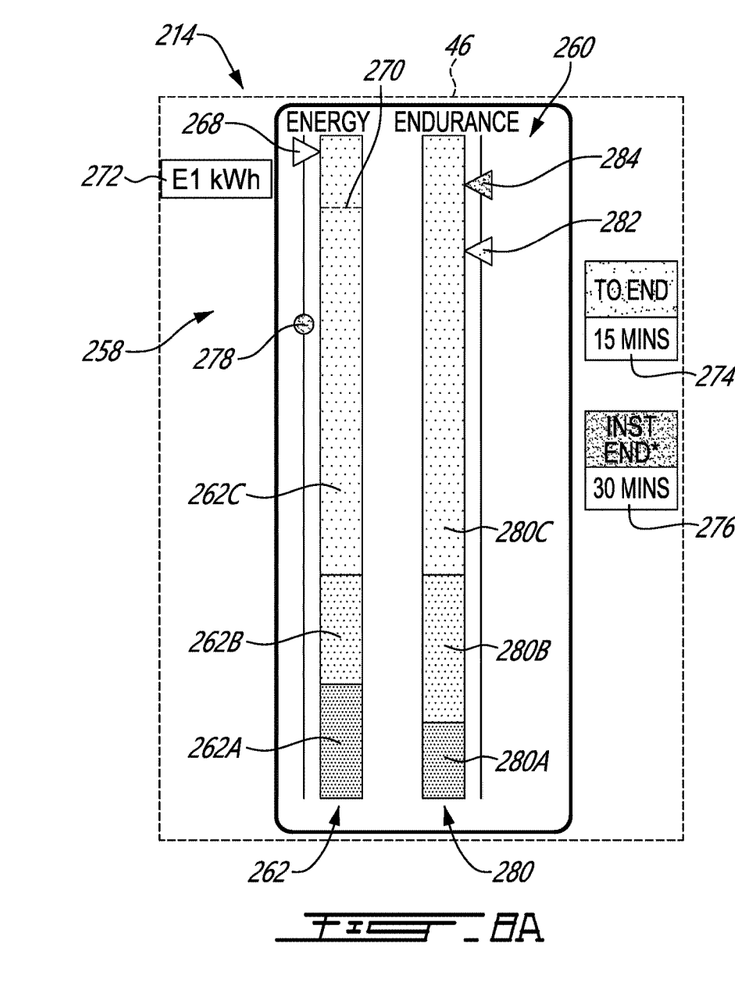
FIGS. 8A and 8B show another exemplary indicator of the hybrid power plant in respective different states of operation of an electric motor of the hybrid power plant.
Figure 8B:
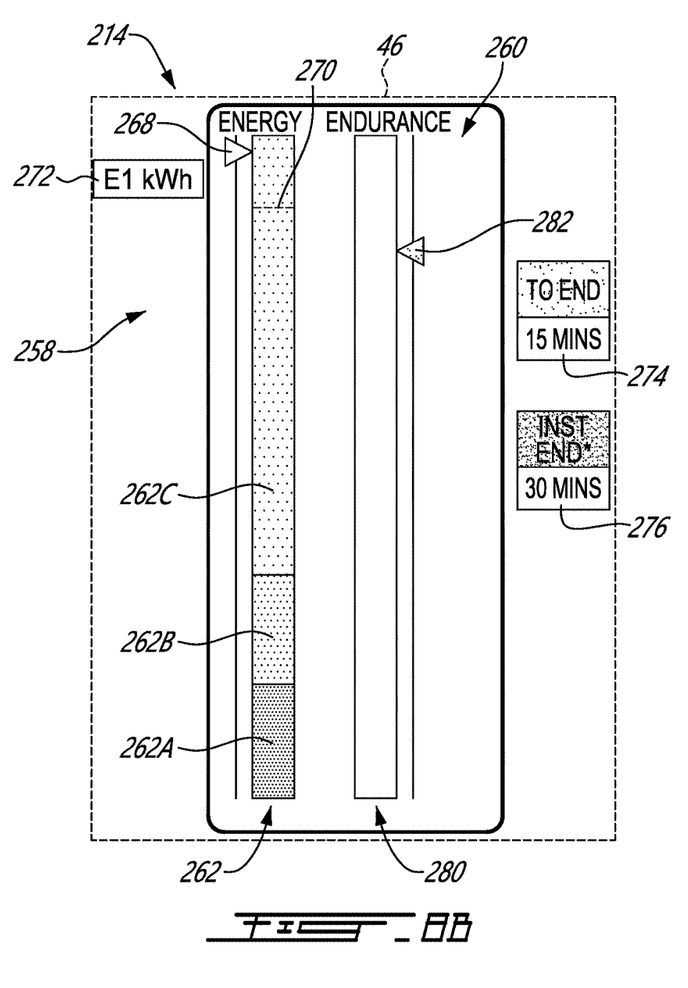

FIGS. 8A and 8B show another exemplary indicator 214 of power plant 12 in different respective states of operation of motor 20. Indicator 214 may include elements of indicators 14, 114 previously described above. Uke elements have been identified using like reference numerals incremented by 200. FIG. BA may represent a state of indicator 214 corresponding to when motor 20 of power plant 12 is operating to drive propeller 16. In reference to FIG. BA, indicator 214 may include first visual indication 258 and second visual indication 260. First visual indication 258 may include first scale 262 including first region 262A, second region 262B and third region 262C. First visual indication 258 may include first marker 268 movable along first scale 262 and tick mark 270 indicating a minimum amount of energy stored in energy source 30 required at takeoff. First visual indication 258 may include first textual field 272 and second marker 278. Second visual indication 260 may include second textual field 274 and third textual field 276.

In contrast with indicators 14 and 114, second visual indication 260 of indicator 214 may optionally include second scale 280 where the remaining run time for motor 20 is graphically indicated along second scale 280 in addition to being numerically indicated via second textual field 274 and third textual field 276. In some embodiments, second scale 280 may have two or more visually distinct regions. For example, second scale 280 may have first region 280A, second region 280B and third region 280C visually indicated along second scale 280. Regions 280A-280C may be disposed sequentially along second scale 280 and may represent different levels of endurance for motor 20 based on the energy available in energy source 30. Second region 280B may be located between first region 280A and third region 280C along second scale 280. First region 280A may extend a first span along second scale 280 and represent a relatively low remaining run time (i.e., low endurance level). Second region 280B may extend a second span along second scale 280 and may represent a remaining run time (e.g., medium endurance level) greater than the remaining run time associated with first region 280A. Third region 280C may extend a third span along second scale 280 and represent a relatively high remaining run time (i.e., high endurance level) greater than the remaining run time associated with second region 280B.

In various embodiments, regions 280A-280C of second scale 280 may be visually distinguished from each other using different colors, different fill patterns, different line types or different line weights. For example, first region 280A may be a red portion of second scale 280, second region 280B may be an amber portion of second scale 280, and third region 280C may be a green portion of second scale 280.

In some embodiments, second scale 280 may be in the form of a linear bar (i.e., thick line) or a thinner straight line. Second scale 280 may have a vertical or horizontal orientation in display area 46. Alternatively, second scale 280 may be arcuate and may be part of a rotary dial for example. Second scale 280 may be adjacent to first scale 262. In some embodiments, first scale 262 and second scale 280 may be parallel and disposed side by side. In some embodiments, first scale 262 and second scale 280 may have the same length and have adjacent extremities.

The endurance level may be visually indicated along second scale 280 using third marker 282 associated with second textual field 274. Third marker 282 may have the same color as a label associated with second textual field 174 to visually establish the relation. Third marker 282 may indicate an endurance level for a discharge rate of energy source 30 associated with a takeoff (e.g., maximum) output power setting for motor 20.

The endurance level may also be visually indicated along second scale 280 using fourth marker 284 associated with third textual field 276. Fourth marker 284 may have the same color as a label associated with third textual field 176 to visually establish the relation. Fourth marker 284 may indicate an endurance level for a discharge rate of energy source 30 associated with a current output power setting for motor 20.

Third marker 282 and fourth marker 284 may have different colors or otherwise be visually distinct from each other. Third marker 282 and fourth marker 284 may each be an arrow, dot, caret, needle or may have another suitable shape. Computer 32 may cause the respective positions of third marker 282 and fourth marker 284 to be adjusted (e.g., substantially in real-time) as energy source 30 is depleted or recharged. Computer 32 may cause the position of fourth marker 284 to be adjusted (e.g., substantially in real-time) to reflect changes in the TLA.

FIG. 8B may represent a state of indicator 214 corresponding to when motor 20 of power plant 12 is not operating to drive propeller 16. In reference to FIG. 8B, one or more elements of indicator 214 may be removed from indicator 214 when motor 20 is not operating, and one or more elements of indicator 214 may be retained when motor 20 is not operating. For example, second marker 278 (i.e., battery energy vector) may be omitted from indicator 214 when motor 20 is not operating. Similarly, fourth marker 284 and the numerical value associated with third textual field 276 may also be omitted from indicator 214 when motor 20 is not operating. In some embodiments, the appearance of second scale 280 may also be altered to eliminate the visually distinct regions 280A-280C. For example, second scale 280 may be modified to have a uniform appearance (e.g., only one color) along its length when motor 20 is not operating.

Figure 9:
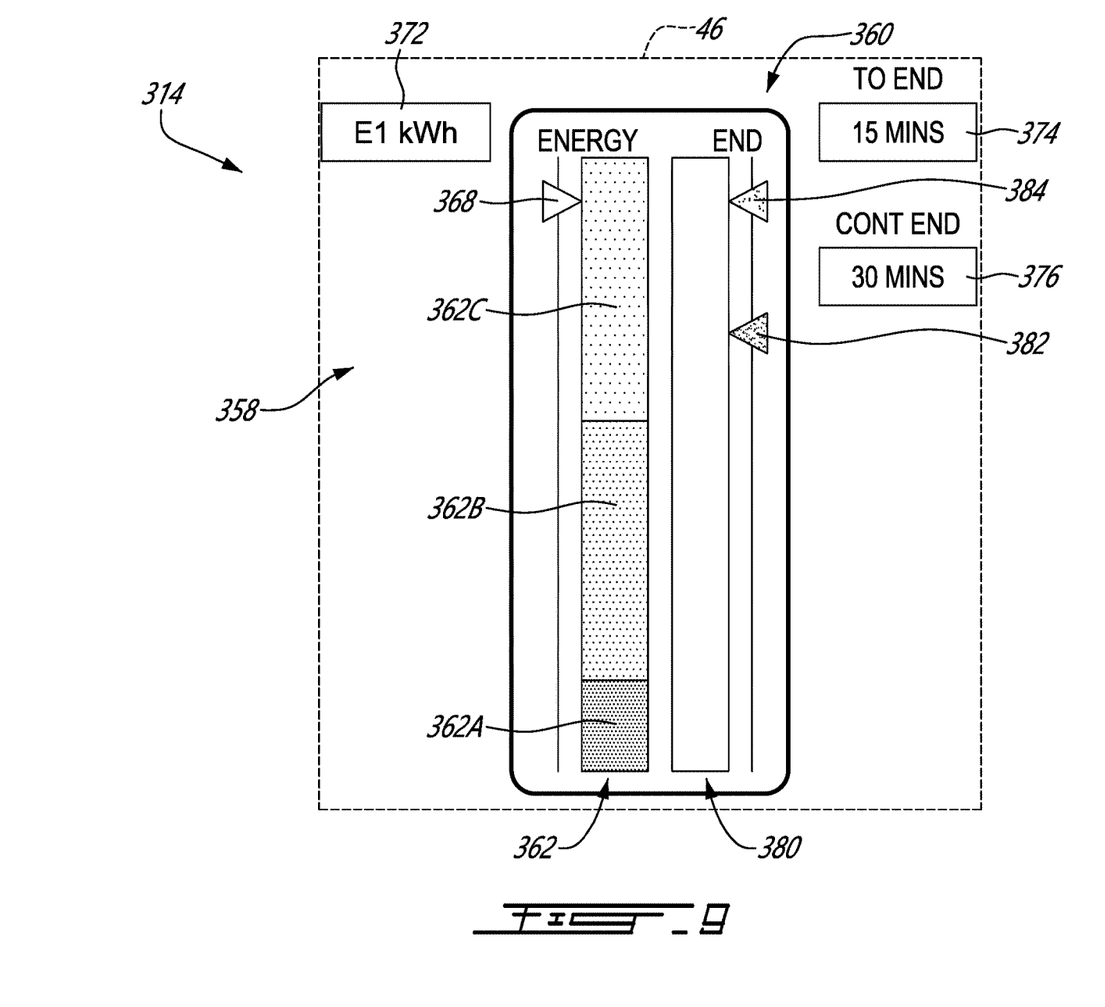
FIG. 9 shows another exemplary indicator of the hybrid power plant.

FIG. 9 shows another exemplary indicator 314 of power plant 12 during a state when motor 20 is being operated. Indicator 314 may include elements of indicators 14, 114, 214 previously described above. Like elements have been identified using like reference numerals incremented by 300. Indicator 314 may include first visual indication 358 and second visual indication 360. First visual indication 358 may include first scale 362 including first region 362A, second region 362B and third region 362C. First visual indication 358 may include first marker 368 movable along first scale 362. First visual indication 358 may include first textual field 372. Second visual indication 360 may include second textual field 374 and third textual field 376. Second visual indication 360 may include third marker 382 associated with second textual field 374. Second visual indication 360 may include fourth marker 384 associated with third textual field 376.

In contrast with indicators 14, 114 and 214, second visual indication 360 of indicator 314 may optionally include second scale 380 that is devoid of visually distinct regions. For example, second scale 280 may have a uniform appearance (e.g., only one color) along its length when motor 20 is operating. In various embodiments, indicator 314 may or may not have a tick mark indicating a minimum amount of energy stored in energy source 30 required at takeoff. In various embodiments, indicator 314 may or may not have a second marker (e.g., battery energy vector) indicating a future amount of energy stored in energy source 30 along first scale 362 based on a current discharge rate of energy source 30.

Figure 10:
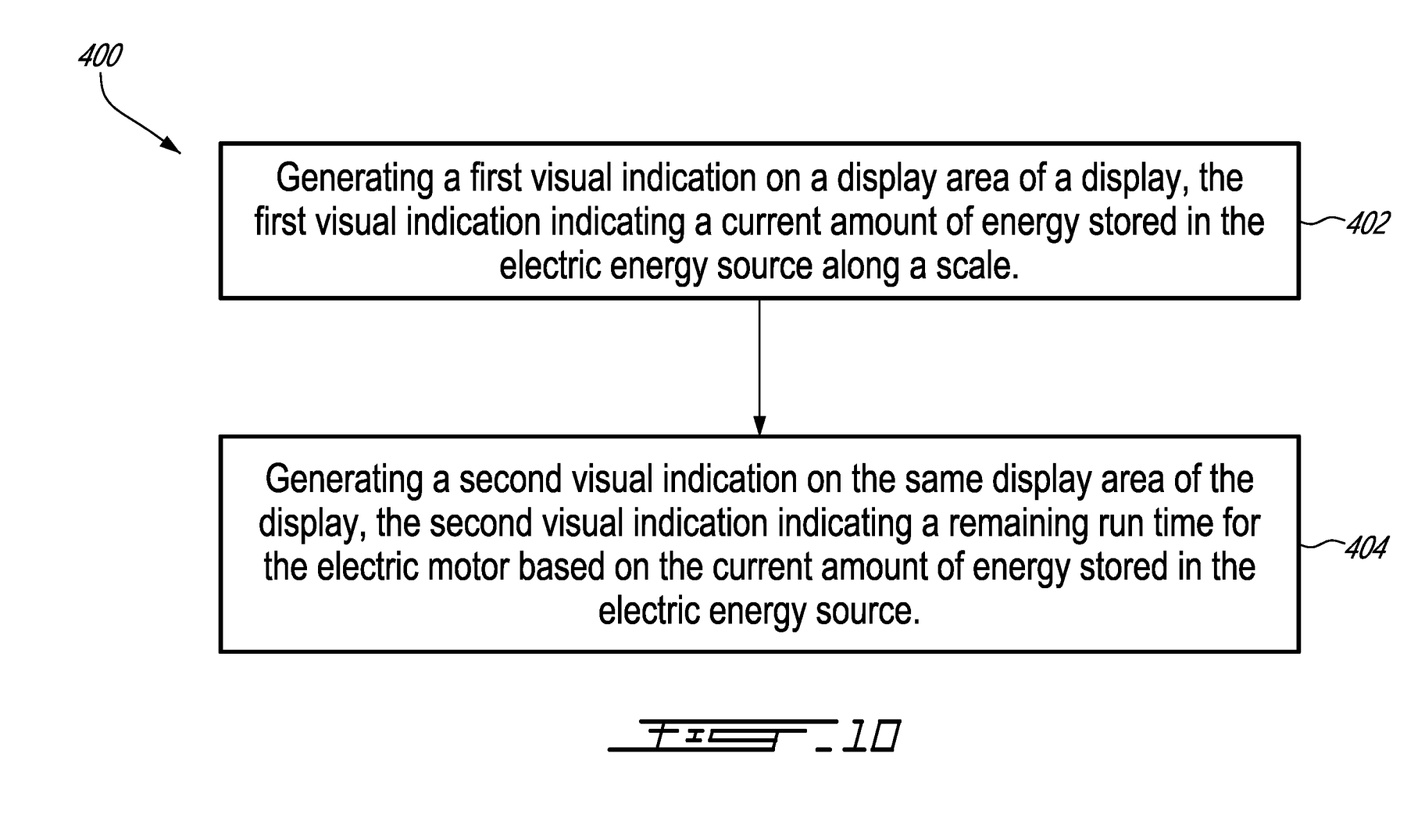
FIG. 10 is a flow diagram of an exemplary method of indicating an operational state of a hybrid aircraft power plant.

FIG. 10 is a flow diagram of an exemplary method 400 of indicating an operational state of power plant 12 configured to drive an air mover of an aircraft. Method 400 may be performed using indication system 44 or using another indication system. Method 400 may include elements of power plant 12, or indication system 44 and/or of indicators 14, 114, 214 and 314. In various embodiments, method 100 may include, when the air mover is driven by motor 20 of power plant 12 using energy stored in energy source 30:

generating first visual indication 58, 158, 258, 358 on display area 46 of display 36, first visual indication 58, 158, 258, 358 indicating a current amount of energy stored in energy source 30 along first scale 62, 162, 262, 362 having first region 62A, 162A, 262A, 362A, second region 62B, 162B, 262B, 362B and third region 62C, 162C, 262C, 362C visually indicated along first scale 62, 162, 262, 362, first region 62A, 162A, 262A, 362A representing a first amount of energy insufficient to execute a go-around with aircraft 10, second region 62B, 162B, 262B, 362B representing a second amount of energy greater than the first amount of energy and sufficient to execute the go-around with aircraft 10, third region 62C, 162C, 262C, 362C representing a third amount of energy greater than the second amount of energy and sufficient to execute a takeoff with aircraft 10 (block 402); and generating second visual indication 60, 160, 260, 360 on the same display area 46 of display 36, second visual indication 60, 160, 260, 360 indicating a remaining run time for motor 20 based on the current amount of energy stored in energy source 30 (block 404).

In some embodiments of method 400, first visual indication 58, 158, 258, 358 may include first marker 68, 168, 268, 368 movable along first scale 62, 162, 262, 362 to graphically indicate the current amount of energy stored in energy source 30 along first scale 62, 162, 262, 362. In some embodiments of method 400, first visual indication 58, 158, 258, 358 may include first textual field 72, 172, 272, 372 (e.g., dynamically) displaying a variable numerical value indicative of the current amount of energy stored in energy source 30.

The embodiments described in this document provide non-limiting examples of possible implementations of the present technology. Upon review of the present disclosure, a person of ordinary skill in the art will recognize that changes may be made to the embodiments described herein without departing from the scope of the present technology.

What is claimed is:

1. A hybrid aircraft power plant comprising:
   an electric motor for driving an air mover configured to propel an aircraft;
   a battery operatively connected to power the electric motor;
   a thermal engine for driving the air mover; and
   an indicator including:
      a first visual indication indicating a current amount of energy stored in the battery along a scale having a first region, a second region and a third region visually indicated along the scale, the first region representing a first amount of energy insufficient to execute a go-around with the aircraft, the second region representing a second amount of energy greater than the first amount of energy and sufficient to execute the go-around with the aircraft, the third region representing a third amount of energy greater than the second amount of energy and sufficient to execute a takeoff with the aircraft; and
      a second visual indication indicating a remaining run time for the electric motor based on the current amount of energy stored in the battery, the first visual indication and the second visual indication both being in a same display area of a display.

2. The hybrid aircraft power plant as defined in claim 1, wherein the first visual indication is adjacent the second visual indication.

3. The hybrid aircraft power plant as defined in claim 1, wherein the first visual indication includes a textual field displaying a variable numerical value indicative of the current amount of energy stored in the battery.

4. The hybrid aircraft power plant as defined in claim 1, wherein the first visual indication includes a marker movable along the scale to graphically indicate the current amount of energy stored in the battery along the scale.

5. The hybrid aircraft power plant as defined in claim 4, wherein the first visual indication includes a tick mark in the third region, the tick mark visually indicating a minimum amount of energy stored in the battery required at takeoff of the aircraft.

6. The hybrid aircraft power plant as defined in claim 4, wherein:
   the marker is a first marker; and
   the first visual indication includes a second marker movable along the scale to graphically indicate a future amount of energy stored in the battery along the scale based on a current discharge rate of the battery.

7. The hybrid aircraft power plant as defined in claim 1, wherein the second visual indication includes a textual field displaying a numerical value indicative of the remaining run time for the electric motor.

8. The hybrid aircraft power plant as defined in claim 1, wherein:
   the scale of the first visual indication is a first scale;
   the second visual indication includes a second scale; and
   the remaining run time for the electric motor is indicated along the second scale.

9. The hybrid aircraft power plant as defined in claim 8, wherein:
   the first scale and the second scale are linear bars; and
   the first scale and the second scale are parallel.

10. The hybrid aircraft power plant as defined in claim 8, wherein the second scale includes two or more visually distinct regions.

11. The hybrid aircraft power plant as defined in claim 8, wherein the second scale is devoid of visually distinct regions.

12. The hybrid aircraft power plant as defined in claim 1, wherein the remaining run time for the electric motor is for a current discharge rate of the battery.

13. The hybrid aircraft power plant as defined in claim 1, wherein the remaining run time for the electric motor is for a discharge rate of the battery associated with a takeoff output power setting for the electric motor.

14. The hybrid aircraft power plant as defined in claim 1, wherein:
   the remaining run time for the electric motor is a first remaining run time for the electric motor for a current discharge rate of the battery; and
   the second visual indication includes a second remaining run time for the electric motor for a discharge rate of the battery associated with a takeoff output power setting for the electric motor.

15. An indication system for a hybrid aircraft power plant including an electric motor and a heat engine for driving an air mover configured to propel an aircraft, the indication system comprising:
   a display providing a display area; and
   a computer operatively connected to the display, the computer being configured to:

cause a first visual indication to be generated in the display area of the display, the first visual indication indicating a current amount of energy stored in a battery powering the electric motor of the hybrid aircraft power plant along a scale, the scale having a first region, a second region and a third region visually indicated along the scale, the first region representing a first amount of energy insufficient to execute a go-around with the aircraft, the second region representing a second amount of energy greater than the first amount of energy and sufficient to execute the go-around with the aircraft, the third region representing a third amount of energy greater than the second amount of energy and sufficient to execute a takeoff with the aircraft; and cause a second visual indication to be generated in the same display area of the display, the second visual indication indicating a remaining run time for the electric motor based on the current amount of energy stored in the battery.

16. The indication system as defined in claim 15, wherein:
the first visual indication includes a first textual field displaying a numerical value indicative of the current amount of energy stored in the battery; and
the second visual indication includes a second textual field displaying a numerical value indicative of the remaining run time for the electric motor.

17. The indication system as defined in claim 16, wherein:
the scale of the first visual indication is a first scale;
the second visual indication includes a second scale; and
the remaining run time for the electric motor is indicated along the second scale.

18. The indication system as defined in claim 15, wherein:
the remaining run time for the electric motor is a first remaining run time for the electric motor for a current discharge rate of the battery; and
the second visual indication includes a second remaining run time for the electric motor for a discharge rate of the battery associated with a takeoff output power setting for the electric motor.

19. A method for indicating an operational state of a hybrid aircraft power plant driving an air mover configured to propel an aircraft, the method comprising:
when the air mover is driven by an electric motor of the hybrid aircraft power plant using energy stored in an electric energy source:
generating a first visual indication on a display area of a display, the first visual indication indicating a current amount of energy stored in the electric energy source along a scale having a first region, a second region and a third region visually indicated along the scale, the first region representing a first amount of energy insufficient to execute a go-around with the aircraft, the second region representing a second amount of energy greater than the first amount of energy and sufficient to execute the go-around with the aircraft, the third region representing a third amount of energy greater than the second amount of energy and sufficient to execute a takeoff with the aircraft; and
generating a second visual indication on the same display area of the display, the second visual indication indicating a remaining run time for the electric motor based on the current amount of energy stored in the electric energy source.

20. The method as defined in claim 19, wherein the first visual indication includes:
a marker movable along the scale to graphically indicate the current amount of energy stored in the electric energy source along the scale; and
a textual field displaying a variable numerical value indicative of the current amount of energy stored in the electric energy source.

\* \* \* \* \*